(12) United States Patent
Thiemke et al.

(10) Patent No.: US 7,287,769 B2
(45) Date of Patent: Oct. 30, 2007

(54) RETENTION FOR UTILITY VEHICLE DRIVE TRAIN SUB-FRAME

(75) Inventors: Daniel Bruce Thiemke, Sun Prairie, WI (US); Brian James Hitt, Forest Lake, MN (US)

(73) Assignee: Deere & Company, Moline, IL (US)

( * ) Notice: Subject to any disclaimer, the term of this patent is extended or adjusted under 35 U.S.C. 154(b) by 441 days.

(21) Appl. No.: 10/880,064

(22) Filed: Jun. 29, 2004

(65) Prior Publication Data

US 2005/0285364 A1 Dec. 29, 2005

(51) Int. Cl.
*B60G 7/02* (2006.01)

(52) U.S. Cl. .............. 280/124.109; 180/312; 280/124.1; 280/124.11; 280/124.128; 280/124.17; 280/124.175

(58) Field of Classification Search ........... 280/124.11, 280/124.1, 124.109, 124.17, 124.175, 124.128, 280/781, 787, 788; 180/311, 312
See application file for complete search history.

(56) References Cited

U.S. PATENT DOCUMENTS

| | | | |
|---|---|---|---|
| 810,379 A | 1/1906 | Pope | |
| 1,058,605 A * | 4/1913 | Kuyper | 280/270 |
| 1,445,604 A | 2/1923 | Schroeder, Jr. | |
| 2,001,029 A | 5/1935 | Kulick et al. | 180/64 |
| 2,322,477 A | 6/1943 | Sjoberg | 180/54 |
| 2,756,834 A | 7/1956 | Dauben | 180/54 |
| 2,836,254 A | 5/1958 | Boehner | 180/64 |
| 2,966,951 A | 1/1961 | Lang | 180/25 |
| 4,425,956 A | 1/1984 | Terlecke | 160/168 |
| 4,798,400 A | 1/1989 | Kosuge | 280/796 |
| 4,821,827 A | 4/1989 | Reese | 180/61 |
| 5,915,495 A | 6/1999 | Kerlin et al. | 180/291 |
| 6,364,048 B1 | 4/2002 | McComber | 180/350 |
| 6,557,661 B1 | 5/2003 | Hurlburt | 180/266 |
| 6,598,891 B2 | 7/2003 | Sakai | 280/124.161 |
| 6,675,926 B2 * | 1/2004 | Montague | 180/350 |
| 6,722,463 B1 | 4/2004 | Reese | 180/292 |

FOREIGN PATENT DOCUMENTS

EP 581318 * 2/1994 ................. 180/311

* cited by examiner

*Primary Examiner*—Eric Culbreth

(57) ABSTRACT

An engine and rear axle are mounted on a drive train sub-frame of a utility vehicle, with two generally parallel plates spaced from each other on the first end of the drive train sub-frame. A cross bolt extends laterally between the two plates and through an opening in a retainer attached to the main frame of the utility vehicle. The retainer opening has a height and width larger than the diameter of the cross bolt.

17 Claims, 6 Drawing Sheets

RETENTION FOR UTILITY VEHICLE DRIVE TRAIN SUB-FRAME

FIELD OF THE INVENTION

This invention relates generally to vehicle suspensions, and more specifically to suspensions to retain a vehicle drive train to the main frame of a utility vehicle.

BACKGROUND OF THE INVENTION

Efforts have been made to provide sturdy and relatively low cost suspensions for utility vehicles that frequently are driven on rugged and uneven terrain. Some of these utility vehicles have a drive train, including an engine and attached gear box, axle and differential, mounted on a sub-frame. Their suspension systems include a first pair of connections between the drive train sub-frame and the main frame of the vehicle through springs at the rear axle of the vehicle. A third connection between the drive train sub-frame and main frame may permit the rear axle, and the drive train sub-frame, to pivot with respect to the main frame. Examples of such connections are shown in U.S. Pat. Nos. 810,379; 2,001,029; 2,756,834; 2,836,254; 2,966,951; and 4,821,827.

This invention addresses two problems that may be found with the third connection between the drive train sub-frame and main frame. First, if the third connection involves direct engagement between the drive train sub-frame and the main frame, vibrations may be transferred from the drive train sub-frame to the main frame. Second, if the drive train sub-frame and main frame are not engaged directly together, the vehicle may not be safely shut down and stopped if the spring connections break at the other end of the drive train sub-frame.

Thus, an improved connection is needed between a drive train sub-frame and main frame that permits the rear axle and drive train sub-frame to pivot, that reduces or minimizes the transfer of vibration from the drive train sub-frame to the main frame, and that constrains the drive train sub-frame from coming loose if one or both of the spring connections between the sub-frame and main frame are broken.

SUMMARY OF THE INVENTION

An improved connection between a drive train sub-frame and a main frame of a utility vehicle includes a generally horizontally aligned cross bolt extending laterally through a retainer. The cross bolt may have a resilient covering. The opening may be generally oblong in shape and may be larger in height and width than the cross bolt. The cross bolt and retainer hold the drive train sub-frame to the main frame of the vehicle, without transmitting vibrations to the vehicle due to rough terrain.

DESCRIPTION OF THE PREFERRED EMBODIMENT

Figure 1:
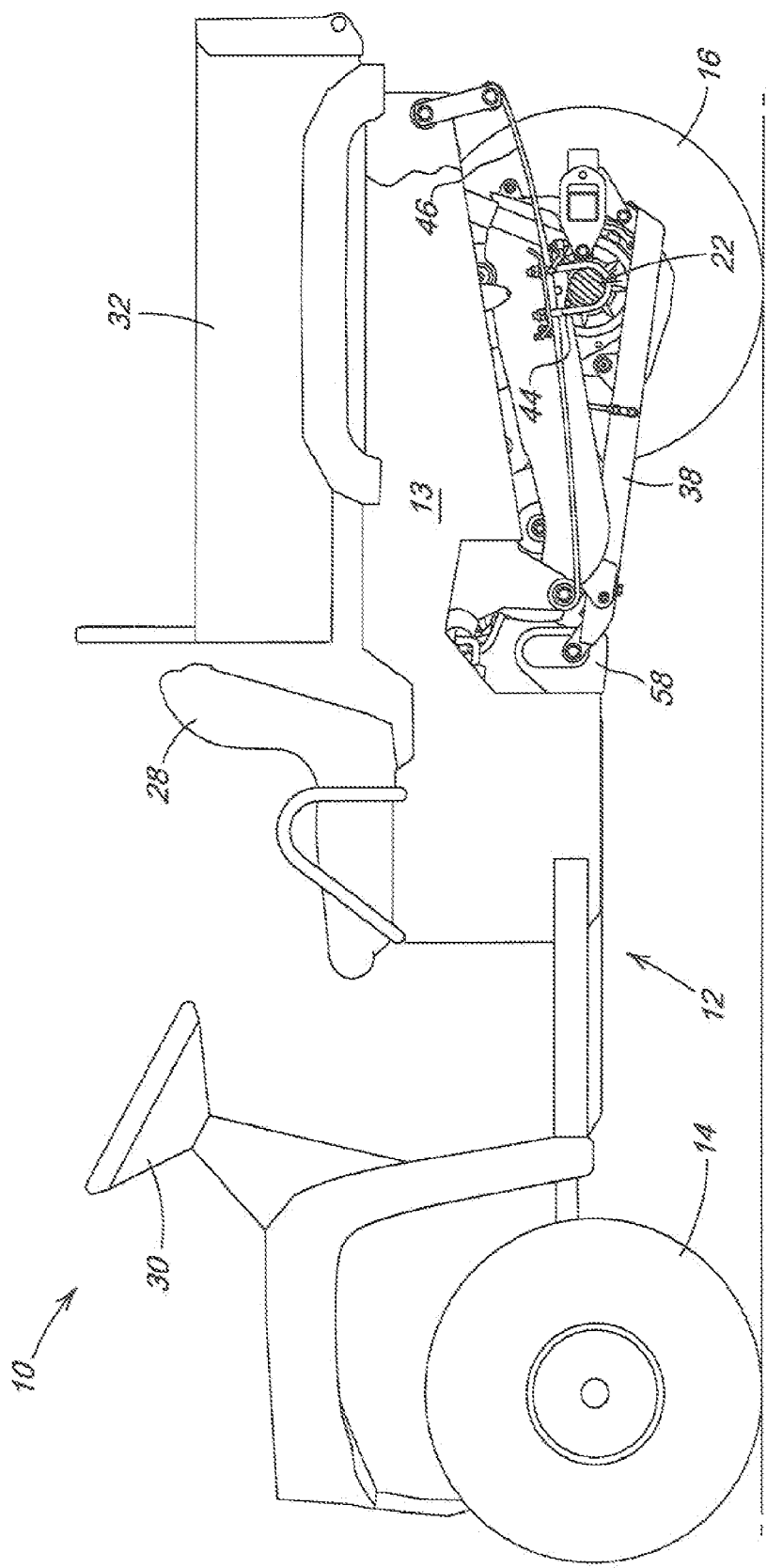
FIG. 1 is a schematic side view of a utility vehicle, partially in section, having a retained suspension according to one embodiment of the invention.
Figure 2:
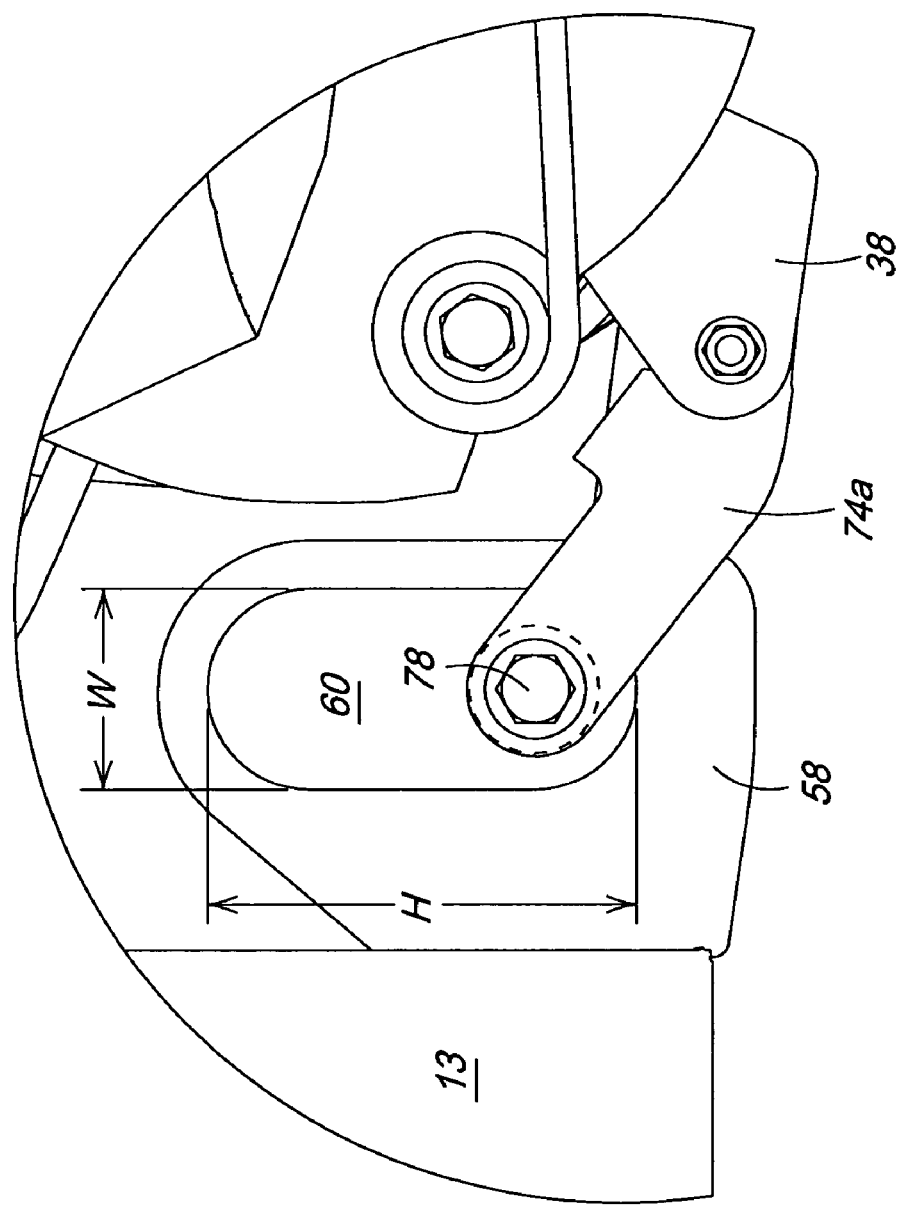
FIG. 2 is a side view of the cross bolt and retainer of a retained suspension in one embodiment of the invention.
Figure 3:
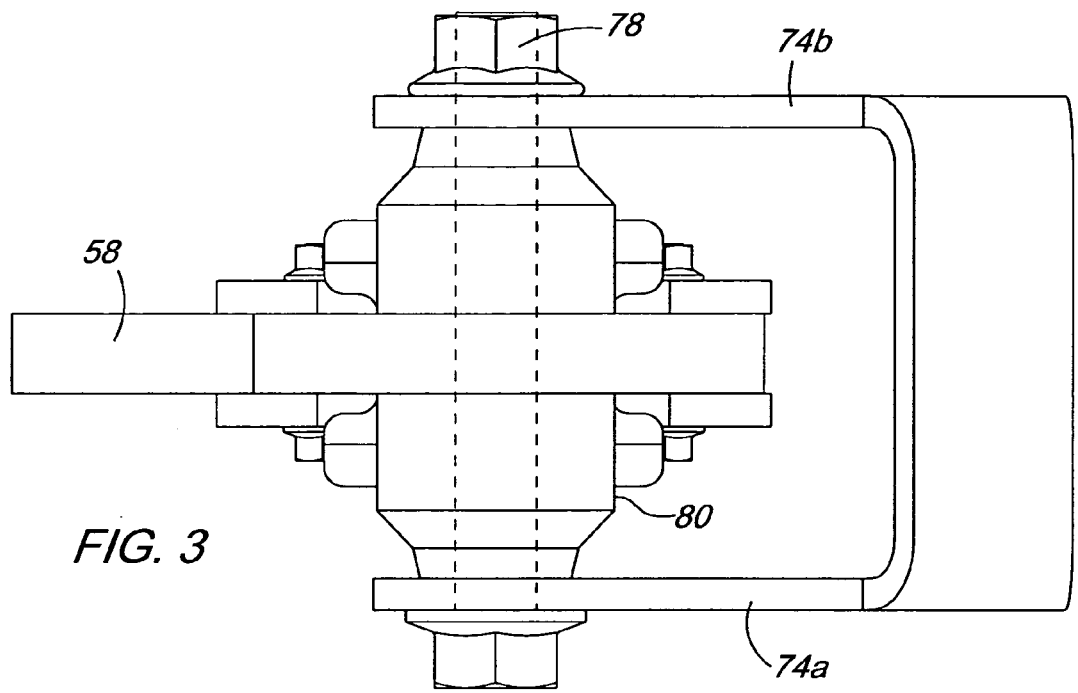
FIG. 3 is a top view of the cross bolt and retainer of a retained suspension in one embodiment of the invention.

As shown in FIG. 1, utility vehicle 10 has main frame 12 with steerable front wheels 14 and powered rear wheels 16 for carrying the vehicle. The front wheels may be steered by steering wheel 30. The main frame may include longitudinal members 13 which optionally may support seat 28 and cargo bed 32. Rear wheels 16 are mounted to rear axle 22 which may be supported and carried by drive train sub-frame 38. Rear axle 22 may extend laterally from an internal combustion engine and transmission, or other power source carried by drive train sub-frame 38.

Now referring to FIGS. 2-5, in one embodiment, a first or front facing end of the drive train sub-frame 38 may have two generally vertically aligned plates 74a, 74b attached to and extending therefrom. Each of the plates is parallel to the other plate, and each plate may be spaced laterally about ½ inch to about 3 inches from the other plate, and most preferably about 1 inch from the other plate.

Cross bolt 78 extends laterally, in a generally horizontal alignment, between the two plates. In one embodiment, cross bolt 78 may be surrounded by a bushing 80 which may be a rubber, elastomeric or other resilient material. Bushing 80 may be cylindrical as shown in FIGS. 2-5. In an alternative embodiment shown in FIG. 6, bushing 81 may have a generally oval or oblong cross section.

Retainer 58 may be attached to the main frame of the vehicle facing the drive train sub-frame, and may have a generally vertical orientation. Cross bolt 78 extends through lateral slot 60 in retainer 58. In one embodiment, retainer 58 may be a plate having a slot 60 with a generally rectangular, oblong, or oval shape. The slot dimensions may be between about 1 inch and about 4 inches in width W, and between about 2 inches and about 6 inches in height H.

In one embodiment, slot 60 has a height H and width W greater than the cross sectional diameter of cross bolt 78 and/or bushing 80. As a result, in one embodiment of the invention, neither the cross bolt nor the bushing touches or comes into contact with retainer 58 during normal operating conditions. For example, the bushing and cross bolt may be spaced at least about 6 mm from the slot walls during normal operating conditions. As a result, vibrations from the drive train sub-frame due to rugged terrain are not transferred to the main frame of the vehicle. However, if the suspension is subjected to high forces that may be caused by high braking, accelerating, extreme suspension jounce and rebound, or engine resonance, the sub-frame may move sufficiently to contact the upper or lower extremes of the slot, or the sides of the slot.

The second or rearwardly facing end of the vehicle sub-frame may be connected to the main frame with a pair of springs 46. For example, U-bolts 44 may hold rear axle 22 to leaf springs 46, and the leaf springs are connected to the main frame in a conventional manner. If the U-bolts or other connections between the sub-frame break, the cross bolt will continue to be constrained by the retainer, thereby holding the sub-frame to the main frame and allowing the safe shut down and stopping of the utility vehicle.

Figure 4:
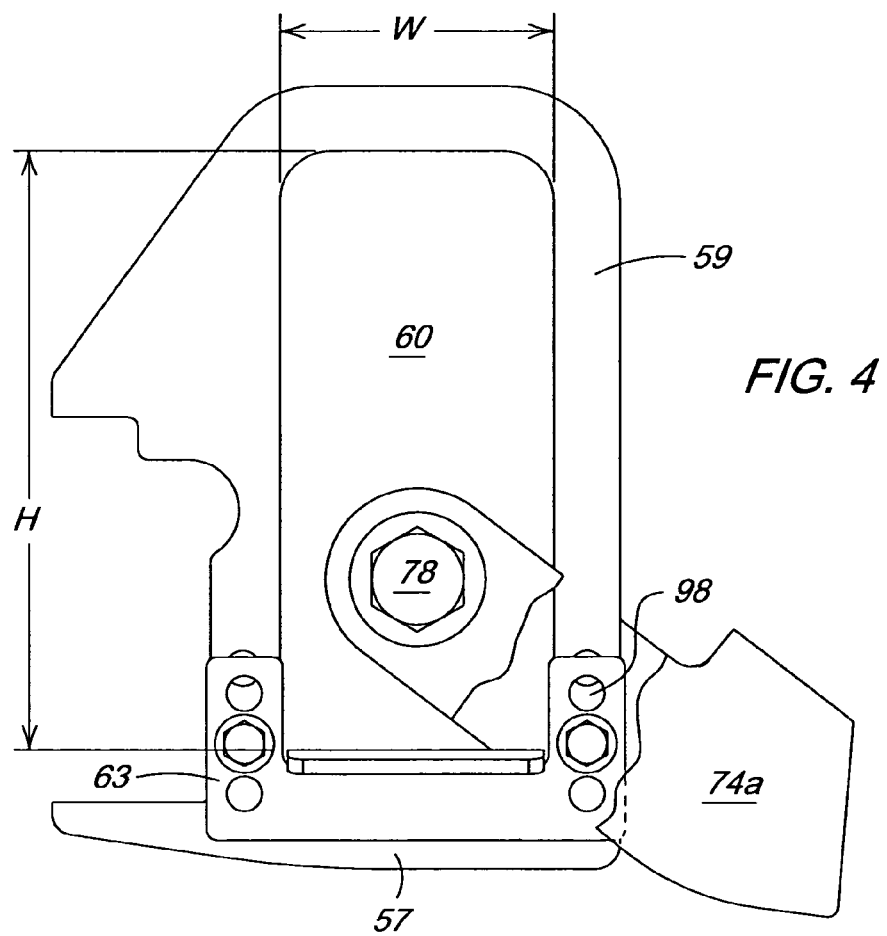
FIG. 4 is a side view of the cross bolt and retainer of a retained suspension in a second embodiment of the invention.
Figure 5:
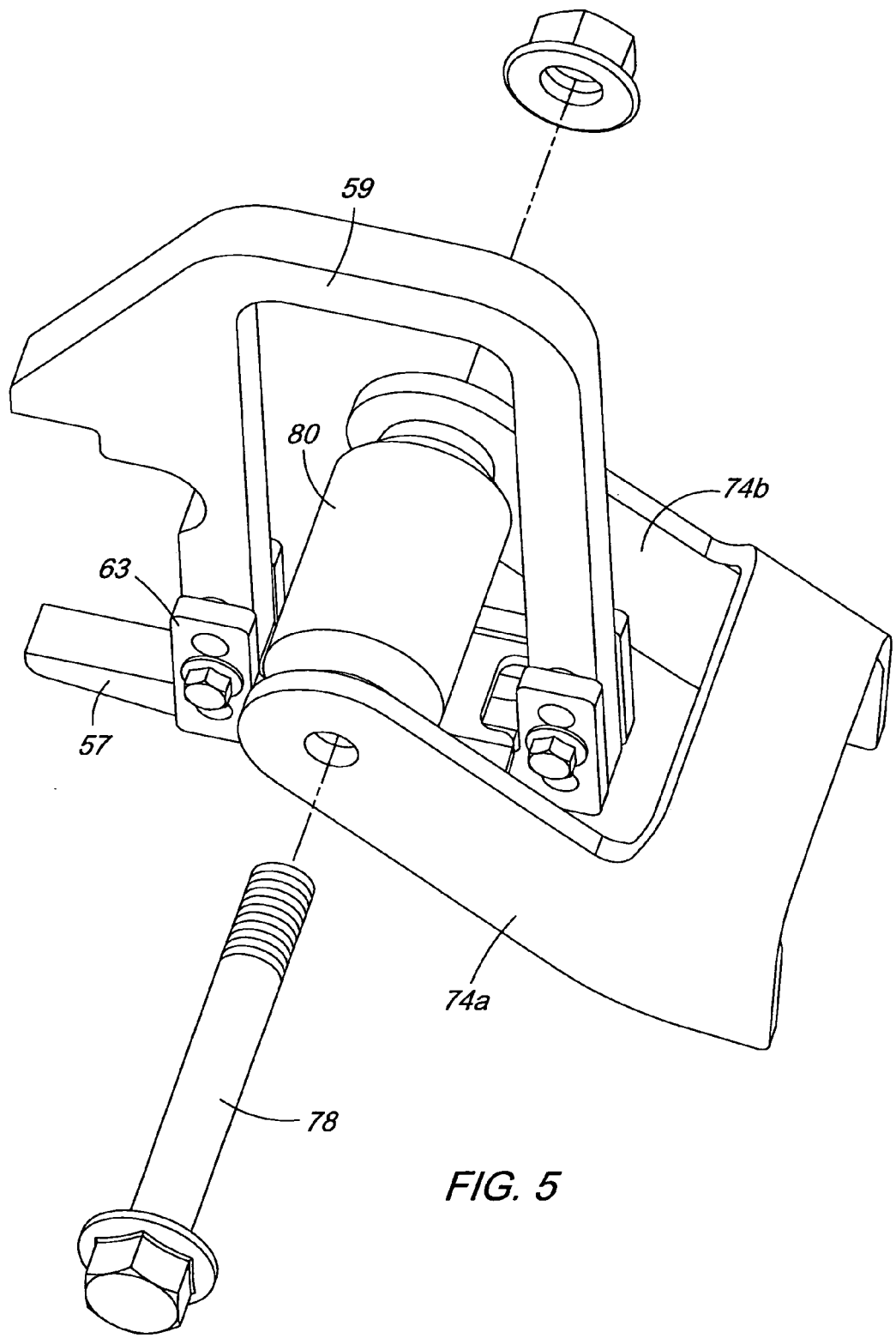
FIG. 5 is an exploded perspective view of the cross bolt and retainer of a retained suspension in a second embodiment of the invention.
Figure 6:
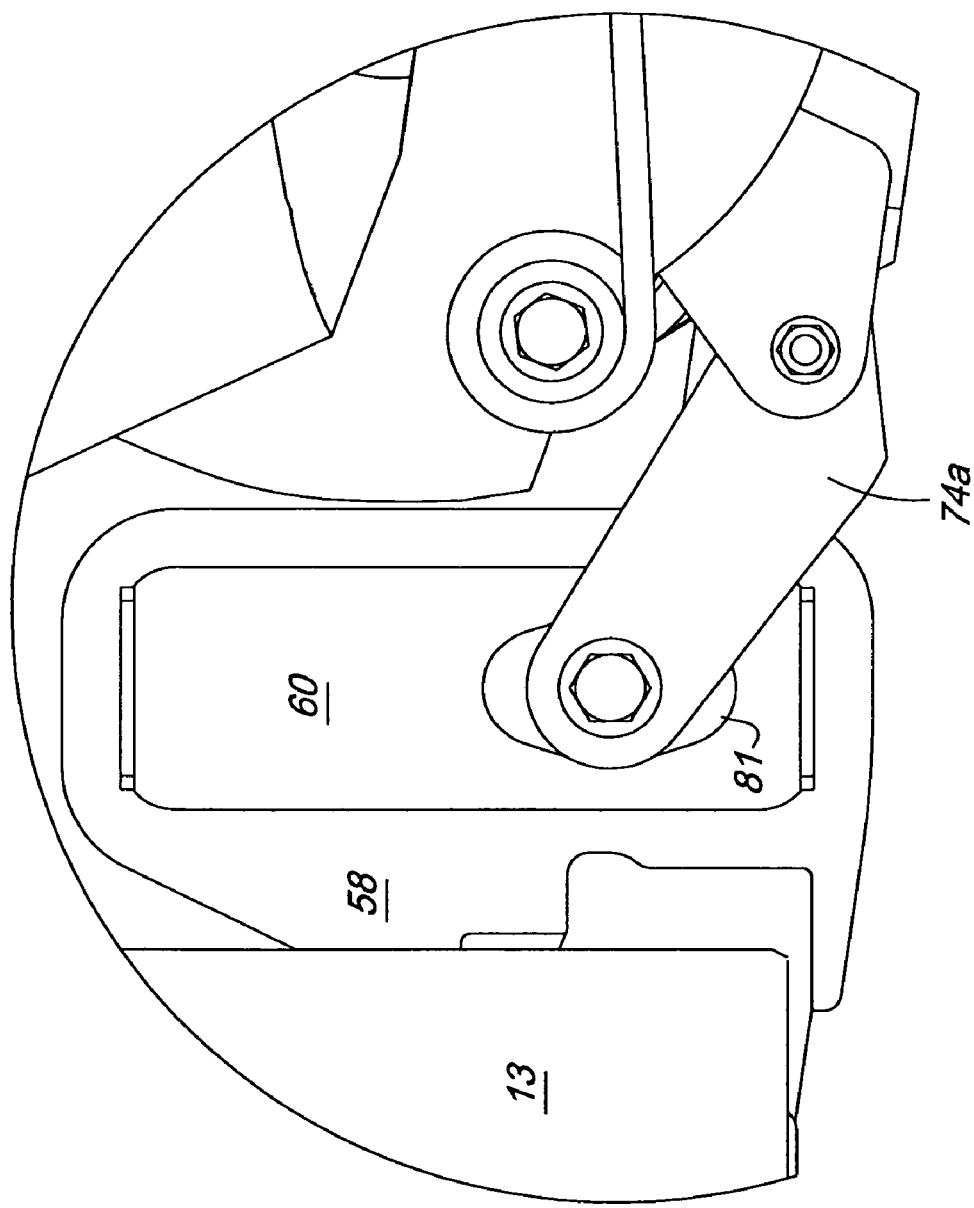
FIG. 6 is a side view of the cross bolt and retainer of a retained suspension in a third embodiment of the invention.

In another embodiment, the retainer may have two or more components that may be assembled or disassembled to allow inserting or removing the cross bolt. For example, as shown in FIGS. 4 and 5, the retainer may comprise upper plate 59, lower plate 57, and bridging plate 63. Optionally, the bridging plate may have a plurality of connection holes 98 or points that may allow adjustment, i.e., expansion or contraction, of the slot height.

Figure 7:
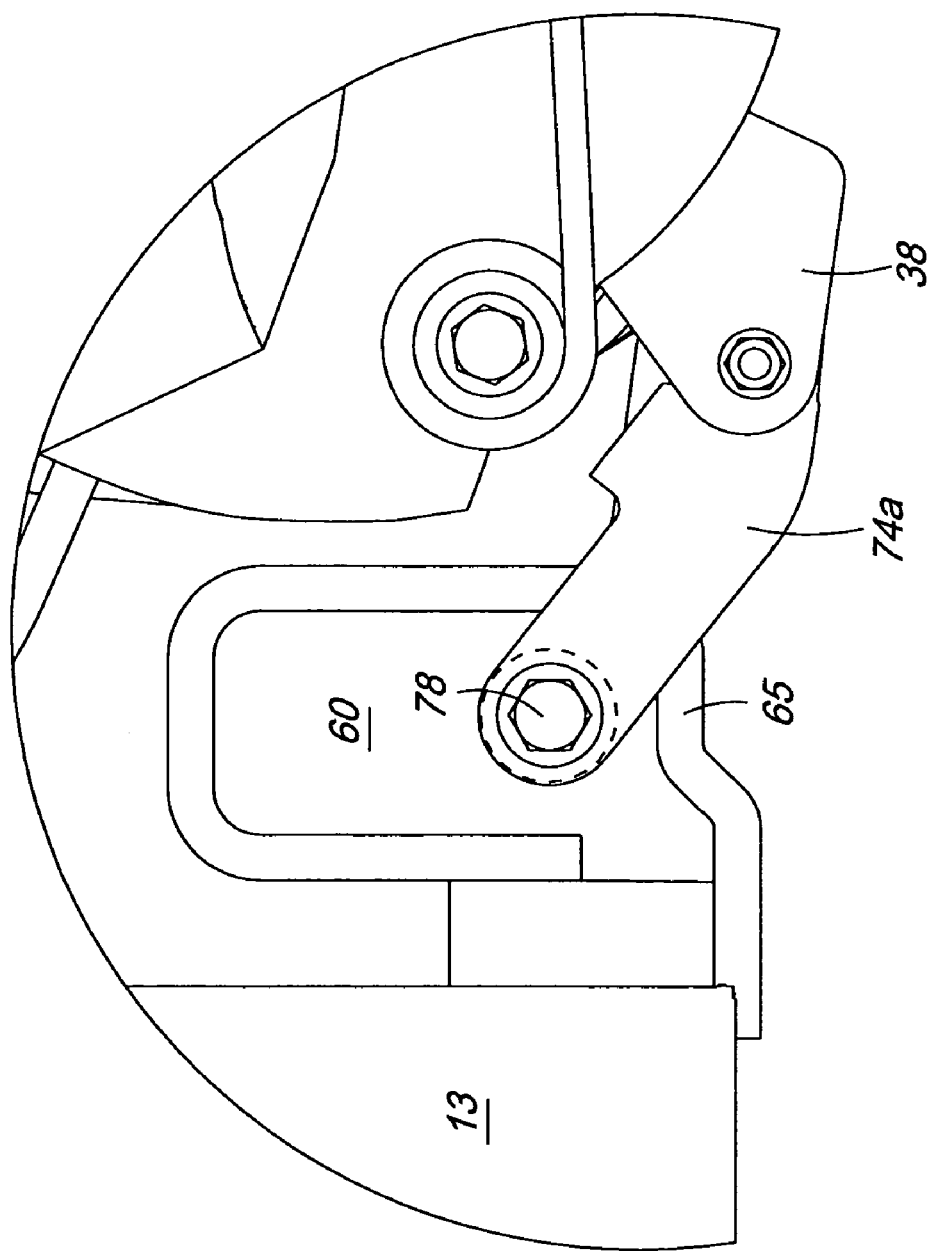
FIG. 7 is a side view of the cross bolt and retainer of a retained suspension in a fourth embodiment of the invention.

In another alternative embodiment shown in FIG. 7, retainer 65 may be a rod or cable that forms a loop. The cross bolt extends through the loop.

Having described the preferred embodiment, it will become apparent that various modifications can be made without departing from the scope of the invention as defined in the accompanying claims.

The invention claimed is:

1. An apparatus comprising:
    an engine and rear axle mounted on a drive train sub-frame of a utility vehicle, the sub-frame having a first end and a second end;
    two generally parallel plates spaced from each other on the first end of the drive train sub-frame;
    a retainer attached to a main frame of the utility vehicle, the retainer having an oblong opening; and
    a cross bolt extending laterally between the two plates and through the oblong opening.

2. The apparatus of claim 1 further comprising a bushing over the cross bolt.

3. The apparatus of claim 1 further comprising a pair of springs through which the second end of the sub-frame is connected to the main frame.

4. The apparatus of claim 3 wherein the pair of springs are leaf springs.

5. The apparatus of claim 1 wherein the two generally parallel plates are aligned in generally vertical planes.

6. An apparatus comprising:
    an engine and rear axle mounted on a drive train sub-frame of a utility vehicle, the sub-frame having a first end and a second end;
    two generally parallel plates spaced from each other on the first end of the drive train sub-frame;
    a retainer attached to a main frame of the utility vehicle, the retainer having an opening;
    a cross bolt extending laterally between the two plates and through the opening; the cross bolt having a diameter and the opening having a height and width larger than the diameter of the cross bolt;
    a bushing over the cross bolt;
    wherein the bushing is generally oval in cross section.

7. An apparatus comprising:
    an engine and rear axle mounted on a drive train sub-frame of a utility vehicle, the sub-frame having a first end and a second end;
    two generally parallel plates spaced from each other on the first end of the drive train sub-frame;
    a retainer attached to a main frame of the utility vehicle, the retainer having an opening;
    a cross bolt extending laterally between the two plates and through the opening; the cross bolt having a diameter and the opening having a height and width larger than the diameter of the cross bolt;
    a bushing over the cross bolt;
    wherein the bushing is generally oblong in cross section.

8. A connection between a drive train sub-frame and a main frame of a utility vehicle comprising a generally horizontally aligned cross bolt extending laterally through and constrained by a generally oblong opening in a generally vertically aligned retainer and holding the drive train sub-frame to the main frame.

9. The connection of claim 8 further comprising a resilient covering over the cross bolt.

10. The connection of claim 8 wherein the generally horizontally aligned cross bolt is connected to the drive train sub-frame.

11. The connection of claim 8 wherein the generally vertical aligned retainer is connected to the main frame.

12. The connection of claim 8 wherein the generally horizontally aligned cross bolt is connected between a first plate and a second plate.

13. An apparatus comprising a drive train sub-frame with a first end and a second end connected to a vehicle main frame by a pair of leaf springs, the first end also connected to the vehicle main frame by a cross bolt inserted through an oblong opening in a retainer, the cross bolt having a generally horizontal alignment; and a rubber bushing on the cross bolt.

14. The apparatus of claim 13 wherein the cross bolt is held to the drive train sub-frame by two laterally spaced vertically aligned plates.

15. The apparatus of claim 14 wherein the two laterally spaced vertically aligned plates are generally parallel to the retainer.

16. The apparatus of claim 13 wherein the retainer constrains the cross bolt when either of the leaf springs are disconnected.

17. An apparatus comprising a drive train sub-frame with a first end and a second end connected to a vehicle main frame by a pair of leaf springs, the first end also connected to the vehicle main frame by a cross bolt inserted through a retainer, the cross bolt having a generally horizontal alignment; and a rubber bushing on the cross bolt; wherein the rubber bushing is generally oval in cross section.

* * * * *